United States Patent [19]

Verner et al.

[11] Patent Number: 4,549,997
[45] Date of Patent: Oct. 29, 1985

[54] DEVICE FOR INCREASING THE OXYGEN CONCENTRATION IN A SUBSURFACE STRATUM OF A THERMALLY STRATIFIED BODY OF WATER

[75] Inventors: Bo L. Verner, Antwerp; Lars B. S. Fors, Wilrijk, both of Belgium

[73] Assignee: Atlas Copco Aktiebolag, Nacka, Sweden

[21] Appl. No.: 612,791

[22] Filed: May 22, 1984

[30] Foreign Application Priority Data

May 30, 1983 [SE] Sweden ............................... 8303030

[51] Int. Cl.[4] .............................................. B01F 3/04
[52] U.S. Cl. .................................... 261/77; 210/221.2; 261/123; 261/124
[58] Field of Search .................... 261/77, 124, 93, 120, 261/123; 210/221.2, 242.2; 209/170

[56] References Cited

U.S. PATENT DOCUMENTS

| | | | |
|---|---|---|---|
| 2,280,979 | 4/1942 | Rocke | 261/93 X |
| 3,503,593 | 3/1970 | Nelson | 261/93 X |
| 3,628,775 | 12/1971 | McConnell et al. | 261/77 |
| 3,759,669 | 9/1973 | Aaron et al. | 261/77 X |
| 3,794,303 | 2/1974 | Hirshon | 261/77 X |
| 4,107,240 | 8/1978 | Verner et al. | 261/77 |

FOREIGN PATENT DOCUMENTS 1301291 12/1972 United Kingdom ................. 261/77

Primary Examiner—Richard L. Chiesa
Attorney, Agent, or Firm—Eric Y. Munson

[57] ABSTRACT

A device for increasing the oxygen concentration in a subsurface stratum of a thermally stratified body of water. The device comprises a flexible tube (13), which is surrounded by a flexible shell (12). Compressed oxygen-containing gas is introduced through first nozzle means (29) at the lower end of the tube and through second nozzle means (31) into channel means (34) between the shell (12) and the tube (13). There is an upward flow of water in the tube and a downward flow in the channel means (34) around the tube.

1 Claim, 2 Drawing Figures

DEVICE FOR INCREASING THE OXYGEN CONCENTRATION IN A SUBSURFACE STRATUM OF A THERMALLY STRATIFIED BODY OF WATER

FIELD OF THE INVENTION

The present invention relates to a device for increasing the oxygen concentration in a subsurface stratum of a thermally stratified body of water while maintaining undisturbed the thermal stratification thereof.

BACKGROUND OF THE INVENTION

According to a prior art solution, see U.S. Pat. No. 4,107,240, oxygen poor water is taken into an air-lift pump from a subsurface stratum. Oxygen is added to the water in the mixing chamber constituted by the air-lift pump. The oxygen-enriched water is then let out into the subsurface stratum.

SUMMARY OF THE INVENTION

The present invention aims at improving the efficiency of a device of the above mentioned type. In order to obtain high efficiency, i.e. dissolve a large amount of oxygen per unit of energy used, and high productivity, i.e. dissolve a large amount of oxygen per hour, the device must be big. In order to make it possible to handle such a big device conveniently it is suggested that the device is made of a flexible material, e.g. a fabric reinforced plastic material. However, this means that certain measures must be taken in order to prevent the collapsing of the device in operation. The problem is that the air-lift pump contains a mixture of water and gas. Therefore the density of the mixture inside the air-lift pump is lower than the density of the fluid outside the pump. This is taken care of by connecting the air-lift pump tube with the surrounding shell and to arrange a slight overpressure between the tube and the shell relative to the surrounding body of water. By introducing gas into the downward water flow between the tube and the shell at a lower end thereof the density of the fluid is lowered so that the load on the tube is decreased. This means that less overpressure is needed between the tube and the shell.

The substantially increased size of the device relative to prior art devices and the introduction of gas into the downward water flow both result in an increase of the time of contact between the water and the oxygen-containing gas. The latter effect is obtained because the downward flow is slowed down. Furthermore, the gas bubbles introduced near the outlet are rich in oxygen and therefore enhance the taking up of oxygen obtained from the primary gasflow. Because these secondary gas bubbles are introduced at a low level, near the outlet, Henrys law will be optimally utilized. This counterflow principle, comprising the downward flow of water and the upward flow of gas, implies the maximum oxygen gradient between said media over the full length of the unit.

The scope of the invention is defined in the appended claims.

BRIEF DESCRIPTION OF THE DRAWINGS

An example of the invention is described below with reference to the accompanying drawings in which.

DETAILED DESCRIPTION OF AN EMBODIMENT OF THE INVENTION

Figure 1:
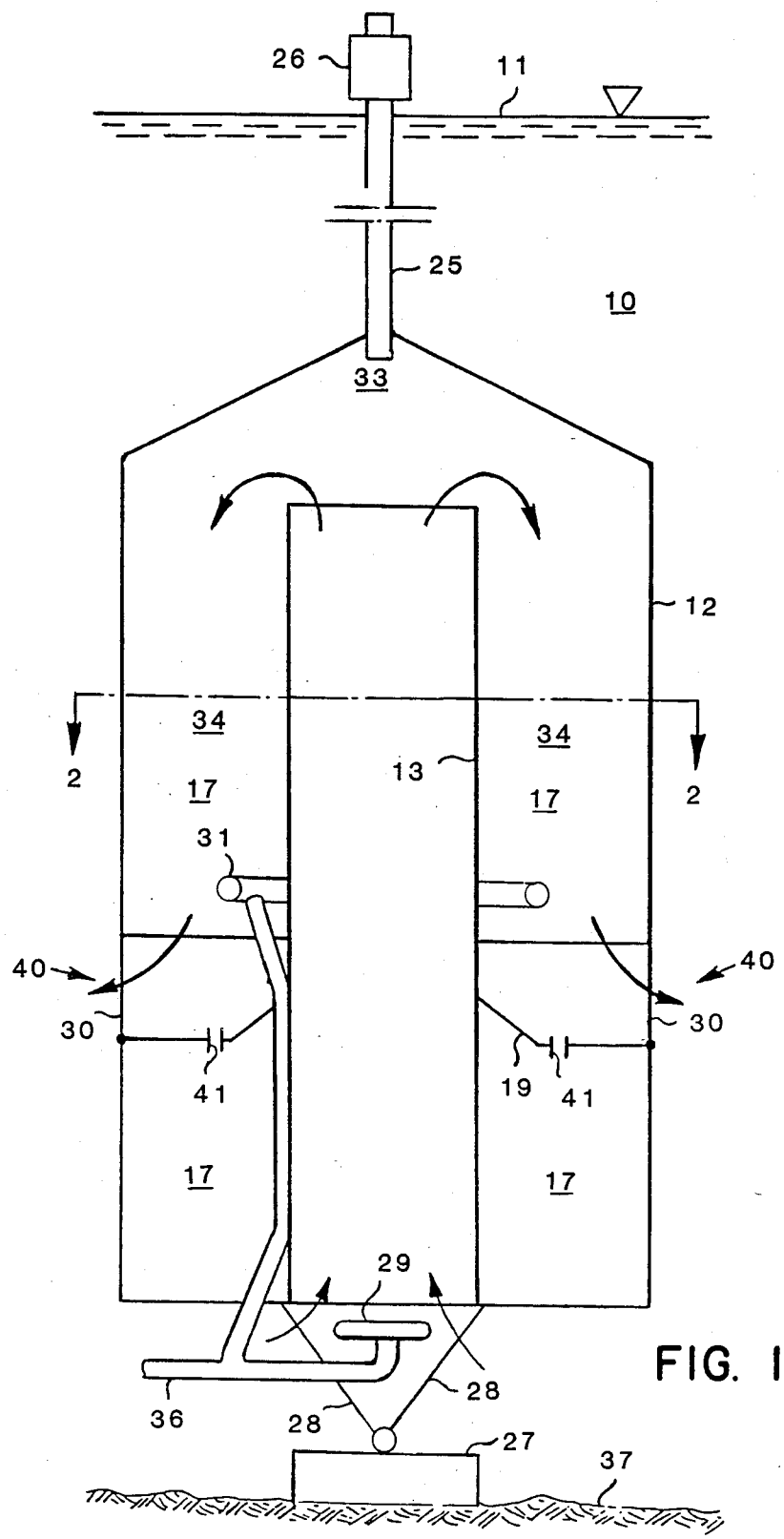
FIG. 1 shows a vertical section through the device.
Figure 2:
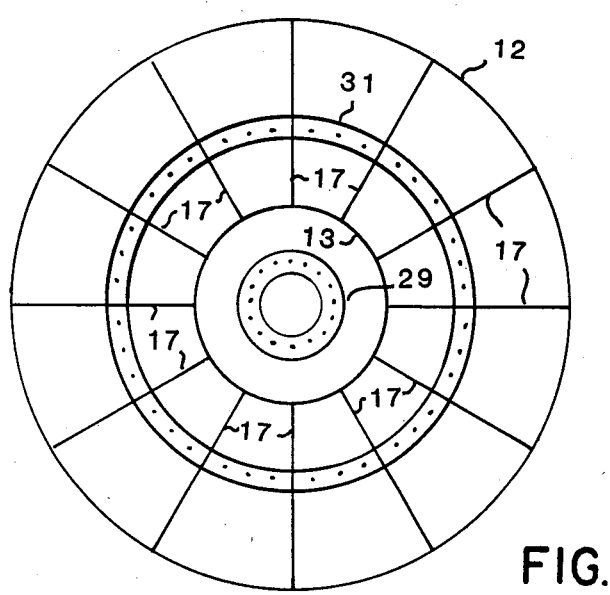
FIG. 2 shows a section according to 2—2 in FIG. 1.

The shown device is anchored by means of ropes 28 to a weight 27 on the bottom 37 of a thermally stratified body of water 10. The distance from the surface 11 to the outlet means 40 of the device is normally at least 8-10 m in order to maintain undisturbed the thermal stratification of the body of water. The device comprises a central tube. A shell 12 extends around the tube. Tube 13 and shell 12 are connected with each other by means of radially extending sheet 17. A water deflecting sheet 19 is arranged between shell 12 and tube 13. There are passages 41 through sheet 19 to interconnect the upper and lower parts of channel 34. Tube 13, shell 12 and sheet 17, 19 are made of a fabric reinforced plastic material. At the upper end of shell 12 a venting passage 25, 26 is provided to connect a gas collecting zone 33 with the atmosphere. The device is further provided with first nozzle means 29 at the lower end of tube 13 for introducing oxygen-containing gas bubbles into tube 13. The device is also provided with second nozzle means 31 for introducing oxygen-containing gas bubbles into channel means 34 between the tube and the shell. The gas is supplied from a not shown source through conduit 36 to both nozzle means. Second nozzle means 31 is connected with sheet 17. The size of outlet means 40 from channel means 34 can be adjusted by means of control means 30 in order to throttle the outflow of oxygen-enriched water. In this way the pressure in channel means 34 is kept at a higher level than the pressure inside tube 13. The tube is thus prevented from collapsing.

The shown device operates in the following way. Compressed oxygen-containing gas, e.g. air, is supplied through conduit 36 to first nozzle means 29 from where gas bubbles rise inside tube 13 so that an upward water flow is generated. During this rising gas and water is mixed so that oxygen is dissolved in the water. Undissolved gas is collected in a gas collecting zone 33 at the top of shell 12 from where the gas is vented to the atmosphere via conduit 25 and valve 26. Conduit 25 has a variable position in collecting zone 33 so that a certain permanent gas volume can be maintained at the very top of the zone. This volume creates an upward force keeping the unit in an upright position especially during standstill of the gas flow supply. Valve 26 restricts the flow so that the gas volume in zone 33 remains constant and small. The rising gas bubbles cause a water flow as indicated with arrows. The rising water is turned downward at the upper end of tube 13 and flows down through channel means 34. At the lower end thereof further oxygen-containing gas coming from conduit 36 is introduced through second nozzle means 31. This gasflow slows down the downward water flow without changing the direction of the water flow. The oxygen-enriched water flow is deflected by the annular sheet 19 and passed out into the surrounding water through outlet means 40 being situated in the substratum to be oxygenated. The flow velocities in the device are such that no gas bubbles follow the water flow leaving the device. Since both the water intake and the outlet means are situated in the substratum of the thermally stratified body of water the thermal stratification is maintained undisturbed.

We claim:
1. Apparatus for increasing the oxygen concentration in a subsurface stratum of a thermally stratified body of water while maintaining undisturbed the thermal stratification thereof, comprising:
(a) an inner open-ended vertical tube (13) having upper and lower ends and an outer surrounding shell (12), both located in said subsurface stratum and both composed of collapsible, flexible material and defining therebetween downwardly-extending channel means (34);
(b) said outer shell (12) having a closed upper end forming a gas collecting chamber (33) above said vertical tube (13);
(c) sheet means (17) between said tube (13) and said shell (12) to maintain the spacing between said tube (13) and said shell (12),
(d) first nozzle means (29) for introducing an oxygen-containing gas under pressure into said lower open end of said tube (13) effective to cause an upward flow of water therein under simultaneous oxygenation thereof;
(e) controlled venting means (25,26) for venting undissolved oxygen gas from said gas collecting chamber (33) to the atmosphere to maintain a predetermined pressure in said gas collecting chamber sufficient to impart a downward flow of the oxygenated water in said channel means (34);
(f) second nozzle means (31) for introducing gas under pressure into said channel means to retard said downward flow;
(g) outlet means (40) in said channel means (34) for passing said retarded downward flow of oxygenated water into the ambient non-oxygenated substratum body of water;
(h) control means (30) for adjusting said outlet means (40) to maintain a pressure in said channel means (34) sufficient to maintain said tube (13) and said shell (12) in non-collapsed condition.

* * * * *